March 13, 1956     R. H. BLYTHE     2,738,303
SYMPATHOMIMETIC PREPARATION
Filed July 18, 1952
*Fig. 1*
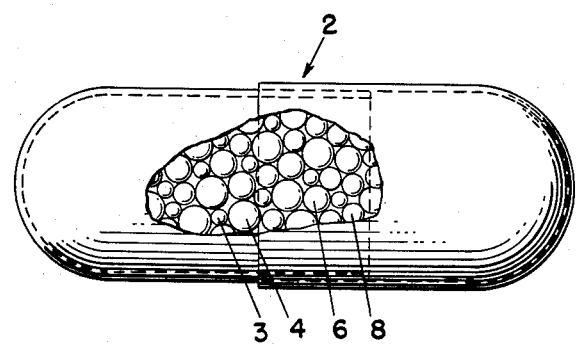
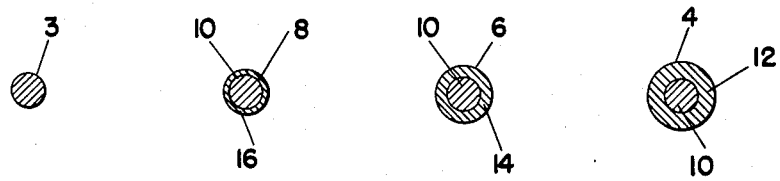
*Fig. 2*
INVENTOR.
RUDOLPH H. BLYTHE
ATTORNEYS

United States Patent Office 2,738,303
Patented Mar. 13, 1956

2,738,303

SYMPATHOMIMETIC PREPARATION

Rudolph H. Blythe, Llanerch, Pa., assignor to Smith, Kline & French Laboratories, Philadelphia, Pa., a corporation of Pennsylvania Application July 18, 1952, Serial No. 299,566

5 Claims. (Cl. 167—82)

This invention relates to a sympathomimetic preparation and, more particularly, relates to such a preparation providing for timed release of a sympathomimetic agent over a long period of time.

The sympathomimetic agents useful with this invention are organic and inorganic acid addition salts of (racemic) amphetamine, dextro-amphetamine, d-desoxyephedrine and (racemic) desoxyephedrine. Exemplary salts are the hydrochloride, phosphate, sulfate, succinate, tartrate and citrate salts.

In accordance with this invention one of the above sympathomimetic agents, or a combination thereof, is continuously released over a long period of time through the use of a large number of small pellets coated with various thicknesses of a material slowly digestible or dispersible in the gastrointestinal tract.

It has been unexpectedly found that the preparation in accordance with this invention controls the level of sleep throughout the entire period of sleep. By this invention it is practical to accurately control body levels so as to provide a desired level of sleep. The benefits stemming from this result are numerous. Of particular importance, it has been found that the preparation of this invention controls nocturnal seizures associated with epilepsy. Other involuntary reactions occurring during sleep, such as eneuresis, are similarly controlled. Again, unexpectedly, the preparation of this invention controls the incidence of migraine headaches occurring on awakening.

Further, when used as an obesity remedy, the constant release of the medicament of this invention over a ten to twelve hour period controls the appetite uniformly throughout the waking hours and hence eliminates one of the greatest factors contributing to obesity, namely, snacking at times other than at regular meal times.

Other beneficial and surprising results have also been noted. Single doses produce jitteriness at peak body levels and subsequently produce mood let-down and irritability on dropping to a low body level. These undesirable side effects have been substantially eliminated. An unexpected increase in the feeling of well being is also achieved.

Again, this invention has surprisingly resulted in a very great increase in reliability, since it has overcome the problem occurring with the single large dosage form heretofore used which frequently became struck en route to the intestines with the resulting delay in medication. Further, the use of a large number of small pellets results in their wide dispersal throughout the intestines.

The dosage unit form in accordance with this invention comprises a capsule containing an initial dose of 2 to 10 mg. of the selected sympathomimetic which is ready for immediate release to the body, being free of any time-delay coating. This 2 to 10 mg. of the selected sympathomimetic can be in the form of numerous uncoated pellets made as described hereafter, or can be simply the crystalline or powdered form of the selected sympathomimetic. This dosage is an amount sufficient to substantially immediately raise the body level to the optimum effective range. The normal single dosage is larger than the initial dose of this invention in order to achieve long action and results in numerous side effects at peak body levels, particularly jitteriness, subsequent let-down and depression of mood.

In the case of a dextro-amphetamine salt this initial dosage preferably should be from 3 to 5 mg. In the case of a racemic amphetamine salt this initial dosage preferably should be from 5 to 10 mg. In the case of a dextro-desoxyephedrine salt this initial dosage preferably should be from 2 to 5 mg. In the case of a racemic desoxyephedrine salt this initial dosage preferably should be from 4 to 10 mg.

In addition the capsule contains from 50 to about 400, preferably about 100, wax-fat covered pellets of the selected sympathomimetic, each coated pellet containing about the same amount of drug. The wax-fat coatings are selected so as to provide a continuous release of the selected sympathomimetic in an amount to maintain substantially constant the body level established by the uncoated amount of the selected sympathomimetic. These coated pellets will contain a total amount of the selected sympathomimetic of from about 200% to 400% by weight of the uncoated initially released dosage.

Where desired, a sedative, such as, for example, a barbiturate, such as 5-isoamyl-5-ethylbarbituric acid (amobarbital), 5-phenyl-5-ethylbarbituric acid (phenobarbital), 5 - ethyl - 5-(1-methylbutyl)-barbituric acid (phentobarbital), sodium-5-secbutyl-5-ethyl barbiturate (butabarbital sodium), 5-allyl-5-(1-methylbutyl)-barbituric acid (secobarbital), or N-methyl-5-ethyl-5-phenylbarbituric acid may be used in admixture with the sympathomimetic agent to form the initially released dosage and in the wax-fat coated pellets. The sedative, when used, should be from about 2 to 8 times the weight of sympathomimetic agent with which it is admixed. The addition of the sedative permits the use of the invention in patients who are very sensitive to sympathomimetics and provides a quieting effect without the depression usually associated with sedatives.

The desired product can be achieved, for example, by combining the uncoated selected sympathomimetic with a plurality of different groups of coated pellets. It is preferred to use 3 groups as a practical matter, but from two to eight groups are satisfactory. It has been found that if the required thickness of coating for release at the end of nine hours is X and the number of coated groups is Y, the first coated group may have a median coating of X/Y, the next group a median coating of 2X/Y, the next 3X/Y, and so on, depending on the number of groups. Following this formula, it has been found that if either of the following techniques are used to make a predetermined median coating for any one group, the coatings will vary within the range of from about 30% to about 40% on either side of the median coating. A satisfactory approximation is achieved where the median coating weights are made up using the above formulae with X representing the weight of the median coating of the group which is released last.

Sympathomimetic pellets in accordance with this invention are readily prepared by utilizing a crystalline or powder form of the selected sympathomimetic and sucrose using procedure well known to the art for making sugar pellets (see, for example, "Confectioner's Journal, January 1951, page 41). By way of more specific example, following the teachings of this publication 20.0 kg. of extended d-amphetamine sulfate is prepared from a mixture of 2.2 kg. of crystalline d-amphetamine sulfate and 17.8 kg. of sucrose. About 200 pellets having a mesh size of from 12–40 are screened out per each gram. The d-amphetamine sulfate content of the pellets is 10–12% of the total weight.

As is also well known to the art, pellets of the selected sympathomimetic can be readily prepared by placing small sugar pellets (non-pareil seeds) of from about 12 to 40 mesh size in a rotating coating pan and coating them with a powder of the selected sympathomimetic. Before the addition of the powder the sugar pellets are wetted in the conventional manner using, for example, syrup U. S. P., or a gelatin coating solution such as one having the following formula:

| | Parts by weight |
|---|---|
| Sucrose | 100 |
| Gelatin | 8 |
| Acacia | 6 |
| Water | 70 |

If desired, the powdered sympathomimetic can be extended with, for example, calcium sulfate dihydrate, powdered starch or powdered acacia prior to being used in the process. The coating operation is repeated until each pellet contains the desired amount of selected sympathomimetic. After the sympathomimetic pellets have been formed, a number of them are provided with a wax-fat coating which is capable of being slowly disintegrated in the gastro-intestinal tract. Such coatings and their application are all well known to the art, the most common method being to place the desired wax-fat combination in solution and spray it over the pellets during the operation of the coating pan holding the pellets.

The wax-fat coating will preferably be a mixture of glyceryl monostearate and beeswax, the glyceryl monostearate being within the range of from 50 to 95% by weight of the total coating. It is preferred to have the glyceryl monostearate about 90% by weight of the total coating. Any other water-insoluble ingestible wax can be substituted for beeswax. Thus, for example, Japan wax, paraffin, carnauba wax, bayberry wax, and other animal, insect, plant or other water-insoluble, non-toxic, wax-like substances, such as sterols, as, for example, cholesterol, are satisfactory. Any other slowly digestible or dispersible solids, such as slowly digestible fatty esters, slowly dispersible fatty acids and slowly dispersible higher fatty alcohols may be used in place of glyceryl monostearate. Thus, for example, stearic acid, palmitic acid, glyceryl tristearate, cetyl palmitate, diglycol stearate, glyceryl myristate, triethylene glycol monostearate, cetyl alcohol, stearyl alcohol, and the like, are satisfactory. It is preferred to use solid fatty acids and alcohols having from 12 to 22 carbon atoms or esters of said solid fatty acids.

In order to spray the wax-fat coating, the wax-fat constituent can be admixed with a suitable warmed solvent such as carbon tetrachloride heated to about 60° C., the wax-fat solids being within the range of from 5–25% by weight of the solution.

Mixtures of the selected sympathomimetic and sedative can be similarly prepared as pellets and coated.

It will be appreciated that the above described method is merely illustrative of how the product of this invention can be achieved, there being multitudinous other equally satisfactory methods within the scope of the invention.

This invention will be further clarified by reading the following description in conjunction with the drawings, in which:

Figure 1 is a plan view of a capsule containing pellets in accordance with this invention.

Figure 2 is a sectional view of typical pellets contained in the capsule of Figure 1.

As shown in Figure 1 a two piece gelatin capsule 2 contains pellets 3 of a selected sympathomimetic, the pellets being uncoated. Capsule 2 further contains wax-fat coated sympathomimetic pellets 4, 6 and 8. As will be apparent from a study of Figure 1, these various pellets are in random distribution, there being approximately an equal number of each group or type of pellet.

As shown in Figure 2, each of the pellets 4, 6 and 8 has a center or core 10 of the selected sympathomimetic. The pellets 4 have a wax-fat coating 12 which is of greater thickness than the wax-fat coating 14 of pellets 6, which in turn is of greater thickness than the wax-fat coating 16 of pellets 8. Coatings 12, 14 and 16 shown in Figure 2 represent the median coatings of the groups formed by pellets 4, 6 and 8, it being appreciated that as previously described the coatings of each group of pellets will vary in order to provide gradual release of the selected sympathomimetic over a ten to twelve hour period.

The following examples are illustrative of dosage unit forms in accordance with this invention and their preparation:

*Example 1*

15.5 kg. of non-pareil seeds (sugar pellets) all passing through a 12 mesh screen, 90% passing through a 40 mesh screen and not over 10% through a 28 mesh screen, were placed in a 36 inch coating pan. The pan was set in rotation and 240 cc. of syrup U. S. P. was added by slowly pouring it on the pellets to evenly wet them. 750 grams of powder, consisting of 80% dextro-amphetamine sulfate and 20% calcium sulfate dihydrate was sprinkled on the wetted mass of non-pareil seeds. The pellets were dried in warm air. The addition of the syrup, dextro-amphetamine sulfate, coating powder and the drying were repeated to apply three additional coats. Talc as a fifth coat was added by wetting the pellets with 240 cc. of syrup and then dusting on 600 gm. of talc. The pellets were rolled until dry and the excess talc was removed by vacuum. 20.0 kg. of dextro-amphetamine sulfate coated pellets were yielded through a 12 mesh screen. One-quarter of the yielded pellets were removed and set aside.

The three-quarters of the batch remaining in the coating pan was coated with a wax-fat coating solution made by admixing 6300 gm. glyceryl monostearate, 700 gm. white beeswax (U. S. P.) and 21,000 cc. of carbon tetrachloride. The wax-fat solution was at a temperature of 70° C. After applying 425 cc. of wax-fat solution, the pellets were dried with air and the coating operation repeated until the weight of the material being coated had increased 10%, at which point one-third of the remaining batch was removed and dusted with talc in a separate coating pan.

The remainder of the batch was further repeatedly coated with the wax-fat solution and dried until the weight of the material increased 10%, over what it weighed when it was separated from the first group of coated pellets; at which time one-half of the remaining pellets were removed and dusted with talc in a separate coating pan.

The remaining pellets were subjected to further repeated coating with the wax-fat solution and drying until the weight of this group of pellets had increased about 10% over the weight of the group from which it had been separated immediately previously. These pellets were then dusted with talc. The weight of the coating of each group was found to vary about ±35% of the median weight of coating of the group involved.

The four groups of pellets thus formed were all placed in a single container and thoroughly mixed to provide a uniform mixture.

Size No. 3 gelatin capsules were then filled with the thus mixed pellets to provide a total dosage of 15 mgs. of dextro-amphetamine sulfate per capsule. Each capsule contained about 100 pellets.

Each No. 3 capsule provided the desired body level of dextro-amphetamine sulfate in about one-half hour. The coated groups provided a continuous release of dextro-amphetamine sulfate and maintained this desired body level for approximately eleven hours.

Example 2

The steps of Example 1 were repeated with the exception that d-desoxyephedrine hydrochloride was substituted for dextro-amphetamine sulfate.

Example 3

The steps of Example 1 were repeated with the exception that racemic amphetamine phosphate was substituted for dextroamphetamine sulfate and No. 1 gelatin capsules used.

Example 4

The steps of Example 1 were repeated with the exception that racemic desoxyephedrine citrate was substituted for dextroamphetamine sulfate and No. 2 gelatin capsules used.

Example 5

4 kg. of non-pareil seeds (sugar pellets), all passing through a 20 mesh screen, were placed in a 24 inch coating pan. The pan was set in rotation and 120 cc. of gelatin coating solution, having the formula set out in column 3 herein, at 60° C. was slowly added to the pellets in such a manner as to evenly wet the sugar seeds. 200 grams of "Dexamyl" coating powder, having the following composition, was scattered over the wetted mass of sugar pellets:

| | Grams |
|---|---|
| Amobarbital (5-isoamyl-5-ethylbarbituric acid) | 3250.0 |
| d-Amphetamine sulfate | 500.0 |

(Passed through #80 mesh screen)

The pellets were then dried using warm air. The addition of the warm gelatin coating solution, amobarbital-dextro-amphetamine sulfate coating powder was repeated 18 times. The pellets were dried with warm air and loose powder in pan was sucked out with a vacuum. The product was freed of lumps by passing through a #14 screen and ⅓ of the yield was set aside.

The two-thirds of the batch remaining in the coating pan was coated with a wax-fat coating solution, made by admixing 1800 grams of glyceryl monostearate, 200 grams of white beeswax (U. S. P.), and 6,000 cc. of carbon tetrachloride. The wax-fat solution was at a temperature of 70° C. After applying 300 cc. of wax-fat solution, the pellets were dried with air and the coating operations repeated until the weight of the material being coated had increased 12.5%. At this point, one-half of the wax-fat coated pellets were removed from the pan and set aside to dry overnight.

The remaining pellets in the coating pan were subjected to further repeated coating, using the warm wax-fat solution until the batch of the material being coated had increased an additional 12.5% in weight. The coated pellets were then dried overnight.

The three groups of pellets thus formed were all placed in a single container and thoroughly mixed to provide a uniform mixture.

No. 1 gelatin capsules were then filled with the thus mixed pellets to provide a total dosage of 97.5 mg. of amobarbital and 15 mg. of dextro-amphetamine sulfate. Each capsule contained about 350 pellets.

Each #1 capsule provided the desired body level of amobarbital and dextro-amphetamine sulfate in about 45 minutes. The coated groups provided a continuous release of amobarbital and dextro-amphetamine sulfate and maintained this desired body level for approximately 12 hours.

It is not desired to be limited except as set forth in the following claims, the above description being by way of illustration only.

What is claimed is:

1. A therapeutic preparation in dosage unit form comprising a capsule containing an initial dosage of from 2 to 10 mg. of sympathomimetic selected from the group consisting of a salt of racemic amphetamine, a salt of dextro-amphetamine, a salt of racemic desoxyephedrine and a salt of dextro-desoxyephedrine to provide a predetermined body level of the selected sympathomimetic, a minimum of 50 pellets containing the selected sympathomimetic in an amount of about 200 to 400% by weight of said initial dosage and having ingestible coatings resistant to disintegration in the gastro-intestinal tract, the coatings being of varying thicknesses to provide for the gradual release of the selected sympathomimetic, said preparation maintaining a substantially constant body level of the selected sympathomimetic over a period of about ten to twelve hours.

2. A therapeutic preparation in dosage unit form comprising a capsule containing an initial dosage of from 2 to 10 mg. of a sympathomimetic selected from the group consisting of a salt of racemic amphetamine, a salt of dextro-amphetamine, a salt of racemic desoxyephedrine and a salt of dextro-desoxyephedrine to provide a predetermined body level of the selected sympathomimetic, 50 to about 400 pellets containing the selected sympathomimetic in an amount of about 200 to 400% by weight of said initial dosage and having ingestible wax-fat coatings resistant to disintegration in the gastro-intestinal tract, the coatings being of varying thicknesses to provide for the gradual release of the selected sympathomimetic, said preparation maintaining a substantially constant body level of the selected sympathomimetic over a period of about ten to twelve hours.

3. A therapeutic preparation in dosage unit form comprising a capsule containing an initial dosage of from 2 to 10 mg. of a sympathomimetic selected from the group consisting of a salt of racemic amphetamine, a salt of dextro-amphetamine, a salt of racemic desoxyephedrine, and a salt of dextro-desoxyephedrine and a sedative to provide a predetermined body level of the selected sympathomimetic, 50 to about 400 pellets containing the selected sympathomimetic in an amount of about 200 to 400% by weight of said initial dosage and a sedative and having ingestible wax-fat coatings resistant to disintegration in the gastro-intestinal tract, the coatings being of varying thicknesses to provide for the gradual release of the selected sympathomimetic, said preparation maintaining a substantially constant body level of the selected sympathomimetic over a period of about ten to twelve hours.

4. A therapeutic preparation in dosage unit form comprising a capsule containing an initial dosage of from 2 to 10 mg. of sympathomimetic selected from the group consisting of a salt of racemic amphetamine, a salt of dextro-amphetamine, a salt of racemic desoxyephedrine and a salt of dextro-desoxyephedrine to provide a predetermined body level of the selected sympathomimetic, a minimum of 50 pellets containing the selected sympathomimetic in an amount of about 200 to 400% by weight of said initial dosage and having ingestible coatings resistant to disintegration in the gastro-intestinal tract, the coatings being of varying thicknesses to provide for the gradual release of the selected sympathomimetic, each of said pellets having a substantially spherical core containing the selected sympathomimetic, and said preparation maintaining a substantially constant body level of the selected sympathomimetic over a period of about ten to twelve hours.

5. A therapeutic preparation in dosage unit form comprising a capsule containing an initial dosage of from 2 to 10 mg. of sympathomimetic selected from the group consisting of a salt of racemic amphetamine, a salt of dextro-amphetamine, a salt of racemic desoxyephedrine and a salt of dextro-desoxyephedrine to provide a predetermined body level of the selected sympathomimetic, a minimum of 50 pellets containing the selected sympathomimetic in an amount of about 200 to 400% by weight of said initial dosage and having ingestible coatings resistant to disintegration in the gastro-intestinal tract, the coatings being of varying thicknesses to provide for the gradual release of the selected sympathomimetic, each of said pellets having a substantially spherical core containing the selected sympathomimetic with the medicament overlying a substantially spherical innocuous seed, and said preparation maintaining a substantially constant body level of the selected sympathomimetic over a period of about ten to twelve hours.

References Cited in the file of this patent

UNITED STATES PATENTS

| | | |
|---|---|---|
| 2,207,990 | Miller | July 16, 1940 |
| 2,536,168 | Goggin | Jan. 2, 1951 |
| 2,540,979 | Clymer et al. | Feb. 6, 1951 |
| 2,619,447 | Malcolm et al. | Nov. 25, 1952 |

FOREIGN PATENTS

| | | |
|---|---|---|
| 109,438 | Australia | Nov. 22, 1938 |

OTHER REFERENCES

Drug Trade News, volume 27, No. 64, February 18, 1952, page 52.

Clinical Medicine, September 1948, page 16.

Chain Store Age, Drug Store Mgr.'s ed., sec. 1, June 1949, p. 95.